Patented Oct. 11, 1938

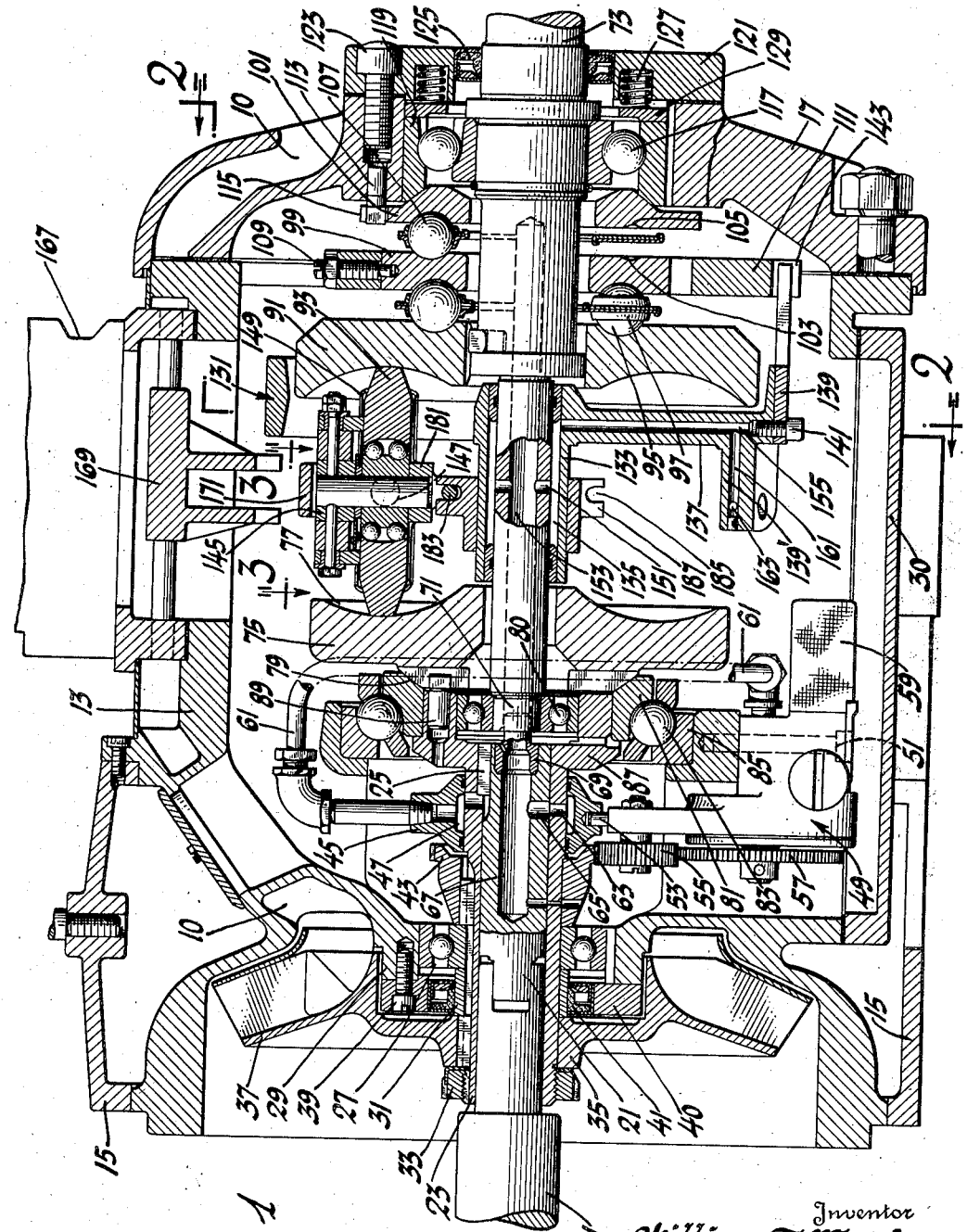

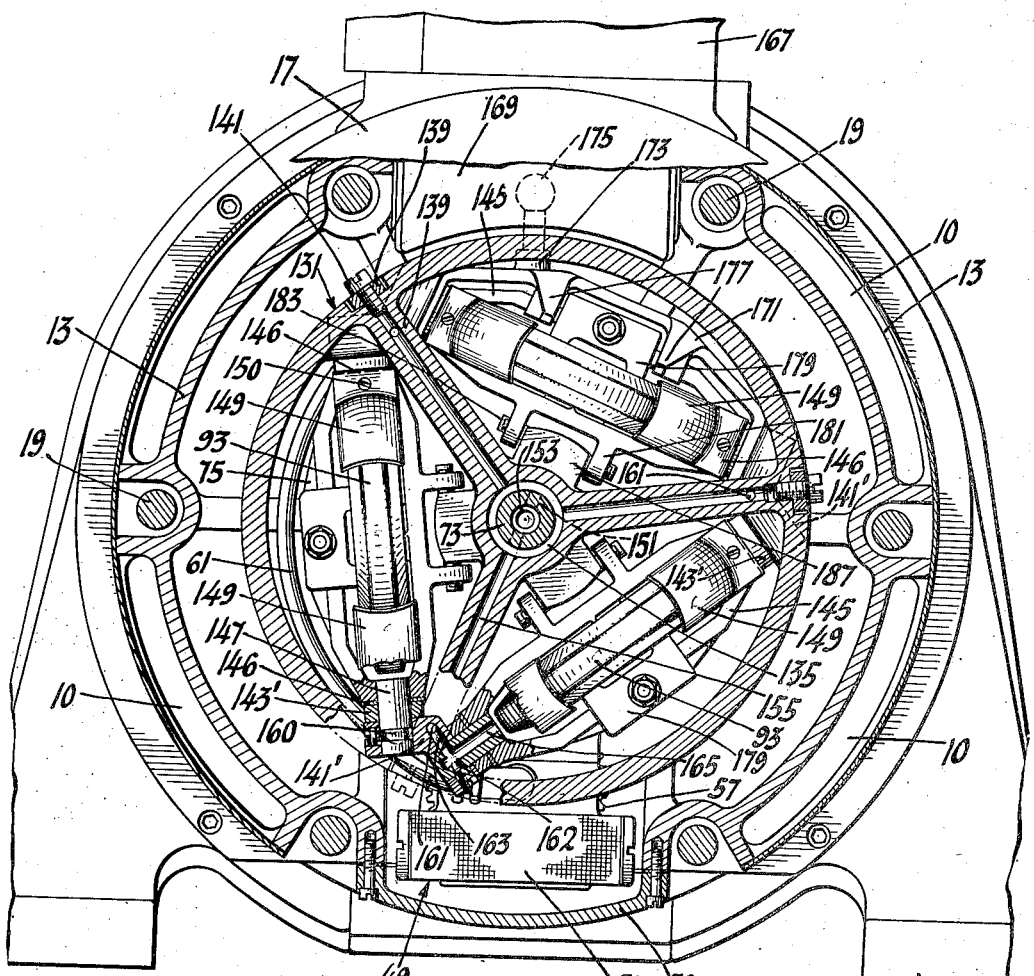

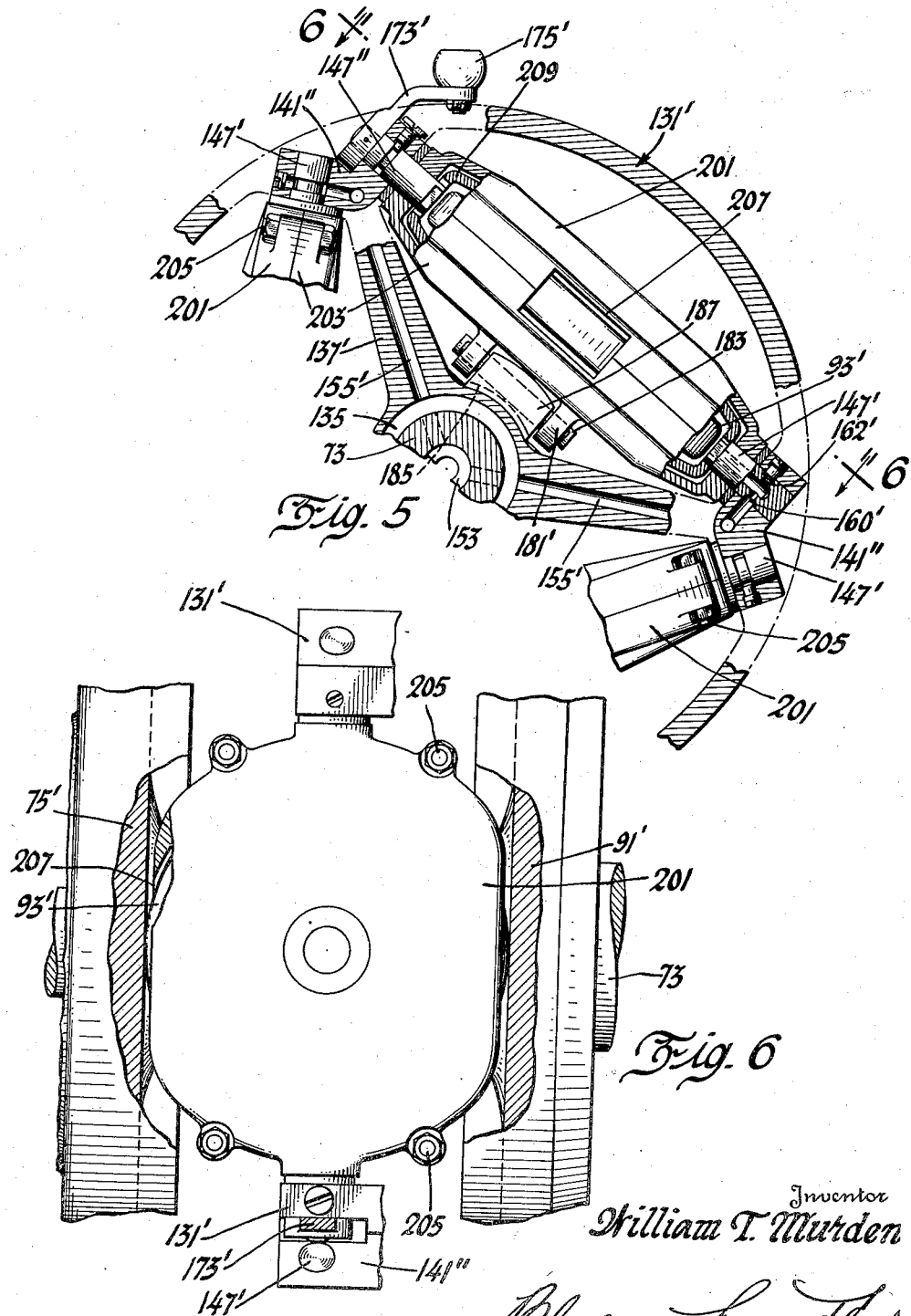

2,132,751

UNITED STATES PATENT OFFICE 2,132,751

FRICTION TRANSMISSION ROLLER LUBRICATION

William T. Murden, Bristol, Conn., assignor to General Motors Corporation, Detroit, Mich., a corporation of Delaware Application April 15, 1935, Serial No. 16,396

15 Claims. (Cl. 184—6)

This invention relates to a change speed transmission and more particularly to the provision for lubrication in a ratio changing device employing a system of toroidal races and cooperating rollers.

An object of the invention is to provide means to insure the delivery of lubricant under pressure to the changing points of contact between the races and rollers as the driving ratio is changed.

Other objects and advantages will be understood from the following description.

The invention has been incorporated in an assembly involving a constant speed motor in driving relation with a toroidal race and roller change speed transmission. In the drawings illustrating the invention, Fig. 1 is a longitudinal section through the ratio changing portion of the combined unit.

Fig. 2 is a transverse section substantially on line 2—2 of Fig. 1.

Fig. 3 is a view in plan, partly in section, as seen from line 3—3 of Fig. 1.

Fig. 4 is a perspective of a detail.

Fig. 5 is a transverse section through a modified form of the invention.

Fig. 6 is a view seen from line 6—6 of Fig. 5.

Referring by reference characters to the drawings, numeral 11 is used to designate a motor shaft. No more of the motor is shown because it is not a part of this invention. The motor is to be associated with a change speed transmission of which the housing is marked by numeral 13. A supporting leg is indicated by numeral 15. An end closure 17 is secured by fastening means 19 to the housing 13.

Mounted to rotate with the motor shaft 11 is an extension shaft 21. A sleeve 23 is keyed at 25 to shaft 21 with the result that the parts 11, 21 and 23 rotate as a unit. A bearing 27 rotatably supports sleeve 23 within the front wall 29 of the transmission housing. Adjacent the bearing 27 and engaging the inner race thereof is a spacing ring 31. Between the ring 31 and a terminal nut 33 there is keyed to the sleeve 23 the hub 35 of a cooling fan 37. This fan is intended to draw air through passages 10 through the housing 13 to cool the mechanism therewithin. Held to the front wall 29 by fastening means 39 is a closure ring 40 between which and ring 31 is an oil retaining device 41. Also keyed to the sleeve 23 and on the inner side of bearing 27 is a driving gear 43, this gear being designed to operate an oil pump to be referred to later. Inwardly of gear 43 is a ring 45 surrounding the sleeve 23 but not rotatable therewith. The ring 45 is internally recessed as at 47.

Upon the removal from the housing 13 of a bottom closure 30 access is had to an oil pump designated as a whole by numeral 49. This pump is removably fixed to a part of the housing by fastening means 51. When so fixed in position a projecting stud 53 engages an opening in the ring 45 to hold the latter from rotation. The upper part of the pump 49 rotatably supports an idler 55 in driving engagement with the above mentioned gear 43 and also with a pump driving gear 57. No novelty is claimed for the details of the pump per se and it is not further illustrated. The pump is shown as having in connection therewith a filtering screen 59 and a delivery conduit 61. This conduit extends to and is connected with the ring 45 as clearly shown in Fig. 1. The ring has a passage leading from the end of the pipe 61 radially into the recess 47. Radial passages 63 and 65 in the sleeve 23 and shaft 21, respectively, communicate at all times with the recess 47 and serve to carry oil into the axial passage 67 within the shaft 21. A centering extension 69 fitted to the end of shaft 21 also engages within the reduced end 71 of driven shaft 73.

Surrounding output shaft 73 but not connected thereto is an input race 75. This race has a toroidal groove 77 on its driving face. On its opposite face there is an extension provided with a spherical surface 79 to engage a similar surface on a bearing race 81. The bearing includes this race, a row of balls 83, and a race 85 supported by the housing. For rotating the toroidal race 75 the sleeve 23 is formed with a flange 87 from which project driving lugs 89 operably engaging the projection portion of the race 75 inwardly of the spherical face 79. A ball bearing 80 is located between the driven shaft and an axial extension of flange 87, which extension carries the above-mentioned lugs 89.

The driven race 91 is mounted for rotation with the driven shaft 73 and for axial sliding relative thereto. This race also is provided with a toroidal groove. A plurality of rollers, one of which is marked 93 in Fig. 1, serves to transmit the rotation of race 75 to race 91. Race 91 is backed by a row of balls 95 in a cage 97, the balls engaging the race 91 and also a reaction torque-loading device. This torque-loading device comprises a ring 99 which is rotatable, a non-rotatable ring 101 and a plurality of balls 107 therebetween. The balls 107 are received within cam grooves 103 and 105 formed in the rings 99 and 101, these grooves being indicated by the variable depths illustrated on Fig. 1. The ring 99 is secured by fastening means 109 to an outer concentric ring 111. Under increase of torque the torque-loading device described above causes the ring 99 to move toward the left (Fig. 1) and crowd the rollers and races more forcibly together to prevent slippage.

The non-rotatable element of the torque-loading device, the ring 101, is held from rotation by a stud 113 projecting from the housing wall 17 into a notch 115 of the ring. The driven shaft 73 is supported in the wall by a ball bearing 117. The outer race 119 of this ball bearing has a spherical face to engage a similar face of the fixed ring 101. A cap 121 is secured to the wall 17 by fastening means 123, there being provided leak-proof packing at 125. In a plurality of pockets in this cap are springs 127. These springs engage and exert pressure on a ring 129 operable upon the outer bearing race 119 to exert a predetermined initial yielding pressure on the torque-loading device and therefore on the races and rollers.

A spider 131 is provided for the mounting of the rollers between the races. This spider has a hub portion 133 having an oil-tight internal space 135 surrounding the shaft 73. The spider is formed with radial arms 137, preferably three in number, from the ends of which arms project axially resilient torque-transmitting members 139. These members are secured as at 141 to the spider arms and engage at their other ends notches 143 in the ring 111. It will be understood that as the torque varies due to changes in load the roller carrying spider tends to rotate. This rotation is resiliently transmitted to the reaction torque-loading device which operates through the balls and cam grooves described above to exert varying pressure between the rollers and races. This feature of the transmission need not be further described as it is not a part of the invention sought to be protected in this application.

The ends of the arms 137 extend axially as shown by numeral 139' and are there shaped as shown at 141' in Fig. 2 to form supports for the roller carriers 145. Cylindrical journals 147 are carried by the angular ends of part 141' as shown in Fig. 2. Spacing members 143' surround these journals as also do the ends of the rocking or tilting roller carriers 145. Between each journaled end of the carrier and the spacer 143' is the apertured head 146 of a shroud. The shroud is bent to engage the side walls of the carrier where it is secured by fastening means 150 extended through an opening 148 in the shoud and into the face of the roller carrier 145. Beyond its point of attachment the shroud is extended in a direction parallel to the circumferential surface of the roller and extends to a point near the region of contact between the roller and the race. It will also be observed that the shroud portion 149 is arcuate in cross section.

The shaft 73 is radially apertured at 151 whereby an inner axial passage 153 of shaft 73 may communicate with the space 135. The axial passage 153 is in communication with and constitutes an extension of the passage 67 in shaft 21. The space 135 communicates with radial passages 155 in the spider arms 137. The ends of these radial passages are closed by the fastening means 141 described above. An axial passage 161 extends from passage 155 into the angular ends 141' mentioned above and shown in Fig. 2. From the end of passage 161 in the head 141' there are passages 163 communicating with circumferential grooves 160 in the journal member 147. From these grooves radial passages 162 and axial passages 165 afford communication for the flow of lubricant into the interior of the carrier 145 occupied by the roller. The shroud described above serves by means of its arms 149 to direct the lubricant along the circumferential surface of the roller toward the two diametrically opposite points of contact between the roller and races.

It will be seen that since the shroud is carried by the carrier it serves to direct the flow of oil to the contacting points regardless of the angle of tilt assumed by the carrier and its roller.

By the above described lubricating arrangement lubricant delivered by the pump passes through pipe 61 into the recess 47. From the recess 47 it passes through passages 63 and 65 into the continuous axial passage 67, 153. From 153 it passes by the radial passages 151 into the space 135. From this space 135 the lubricant travels through the spider passages 155, 161 and 163 to the passages 165 in the journal 147 from which it is delivered to the region occupied by the rollers where it is guided by the arcuate surfaces 149 of the shroud toward the points of contact between the rollers and races. It will thus be seen that the distribution of the lubricant for effective lubrication and cooling is most advantageously provided for.

Although the mechanism for tilting the rollers is not a part of the invention sought to be protected by the patent to issue from this application, the operating mechanism may be very briefly referred to inasmuch as it is illustrated to some extent on the drawings. At the top of the transmission housing is what may be called a control box 167. This control box may contain any suitable mechanism operable to reciprocate a movable member 169. Rotatable on the journals 147 of that one of the carriers 145 which is positioned adjacent the top of the transmission is a rocking member 171. Member 171 has an arm 173 with a knob 175 engaged by movable member 169. This rocking member 171 is provided with suitable means 177 to engage and incline the roller about its points of contact with the races. As the roller thereafter proceeds to rotate it assumes a new position of tilt and in doing so it similarly tilts its carrier by means of parts 179 supported by the carrier and engaged by the roller when displaced as explained above. The rotation of this carrier serves by means of suitable connections with the other carriers to similarly tilt these other carriers. The connections referred to include arms 181 constituting parts of the carriers and pins 183 carried by these arms, which pins engage notches 185 in a sleeve 187 slidable along the hub of the spider. The tilting of the secondary carriers is accompanied by an inclination of their rollers, which rollers then automatically restore themselves to new positions of tilt corresponding to the tilt of the first-mentioned or master roller.

In Fig. 6 is shown a slight modification wherein the function of the shroud is performed by a modified construction of roller carrier. In this form of the invention the spider is marked 131'. The arms 137' have at their ends parts 141'' corresponding to parts 141' in the form of the invention already described. Each roller, such as 93', is journaled as before in a carrier. In this case the carrier is in itself a housing made by two mating sections 201 and 203 secured together by suitable fastening means 205. The housing parts are cut away to form openings at 207 where the roller projects through the opening and engages the races 75' and 91'. The housing itself thus serves to direct the oil received from the same source as before and passing through corresponding radial passages 155' in the arms and communicating with the chamber within the carrier housing by the same disposition of oil passages as has been described. In this form of the invention the process of inclining and tilting are the same. The carrier arm 181' corresponds to the arm 181 of Fig. 2. A slight change has been made in the means to incline the master roller, a change made necessary by the altered construction of the carrier. Within the master roller carrier is a roller inclining member 209. This member is rotatably mounted on stud 147' but is non-rotatably mounted on a rotatable stud 147". This stud or pin has an extended end to which is secured the arm 173' carrying a spherical head 175', the latter engaged by the same expedient—the reciprocating member 169—described above.

I claim:

1. A transmission of the character described comprising races and a system of rollers arranged to transmit by adhesive contact and means for lubricating said system, comprising means for directing the lubricant circumferentially along the race engaging surfaces of said rollers to the points of adhesive contact.

2. A transmission of the character described comprising races and a system of rollers arranged to transmit by adhesive contact and means for lubricating said system, comprising means for directing the lubricant circumferentially along the race engaging surfaces of said rollers to the points of adhesive contact from opposite directions.

3. A transmission of the kind described comprising races and rollers positioned between and in driving engagement therewith at diametrically opposite points of said rollers, a carrier for each roller, pressure lubricating means including a source of fluid pressure, said carriers having passages for the transmission of fluid under pressure and delivering the same adjacent the circumferential faces of each roller, and shrouds mounted on said carrier to direct the lubricant along the roller surface toward its points of contact with the races.

4. The invention defined by claim 3, said shrouds being arcuate in cross section.

5. A transmission of the kind described including races and power transmitting rollers between and in driving engagement therewith, means to support said rollers and to direct lubricant circumferentially along the race engaging surfaces of said rollers to the points of driving engagement.

6. A transmission of the kind described including races and an interposed driving roller in driving engagement therewith, a lubricating system, means to support said rollers and including mechanism to direct lubricant circumferentially along the race engaging surfaces of said rollers to said points of driving engagement.

7. A transmission of the kind described including races and an interposed driving roller in driving engagement therewith, a lubricating system, means to support said rollers and including mechanism to direct lubricant to said points of driving engagement, said roller supporting means including a movable member to change the points of the races engaged by the roller, said mechanism being movable with said movable member whereby the lubricant may be directed to the points of driving contact for all positions of the roller.

8. A transmission of the kind described including races and an interposed roller in driving contact therewith, a force feed lubricating system therefor, means associated with said system to direct lubricant under pressure circumferentially along the roller surface to its contact points with the races.

9. The invention defined by claim 8 together with shifting means to change the position of the roller and therefore the driving ratio, said lubricant directing means being movable with said ratio shifting means.

10. In variable speed transmission having races and an interposed roller, a spider, a carrier for said roller rockingly supported by said spider, a lubricating system including a pressure source, said spider being provided with passages whereby lubricant may be delivered within said carrier to the circumferential surface of the roller, and means associated with said carrier to direct the lubricant along said surface toward both points of contact between the roller and the races.

11. In a power transmission system in which power is transmitted between two coaxial toric races, one of which is the driving member and the other the driven member, by means of a system of rollers in adhesive contact therewith, a frame associated with each roller, within which said roller is journalled, means pivotally mounting said frames for tilting so as to vary the speed ratio of the transmission, and lubricating ducts within the pivots of each of said frames for directing a lubricant against the peripheries of said rollers.

12. In a power transmission system in which power is transmitted between two coaxial toric races, one of which is the driving member and the other the driven member, by means of a system of rollers in adhesive contact therewith, a frame associated with each roller, within which said roller is journalled, means pivotally mounting said frames for tilting so as to vary the speed ratio of the transmission, lubricating ducts within the pivots of each of said frames for directing a lubricant against the peripheries of said rollers, and deflecting means for guiding said lubricant extending laterally of the discharge point and in adjacency to the periphery of the rollers.

13. In a power transmission system in which power is transmitted between two coaxial toric races, one of which is the driving member and the other the driven member, by means of a system of rollers in adhesive contact therewith, lubricating ducts adapted to direct a stream of lubricant perpendicularly against the peripheries of the rollers.

14. In a power transmission system in which power is transmitted between two coaxial toric races, one of which is the driving member and the other the driven member, by means of a system of rollers in adhesive contact therewith, lubricating ducts adapted to direct a stream of lubricant perpendicularly against the peripheries of the rollers and means for guiding said lubricant to the traction areas of said races and rollers.

15. In a power transmission system in which power is transmitted between two coaxial toric races, one of which is the driving member and the other the driven member, by means of a system of rollers in adhesive contact therewith, lubricating ducts adapted to direct a stream of lubricant perpendicularly against the peripheries of the rollers and means for guiding said lubricant tangentially toward the contact areas of the races and rollers.

WILLIAM T. MURDEN.